US005391213A

United States Patent [19]
Frövel

[11] Patent Number: 5,391,213
[45] Date of Patent: Feb. 21, 1995

[54] METHOD FOR MANUFACTURING FIBRE-REINFORCED STRUCTURES WITH A GLASS MATRIX

[75] Inventor: Malte R. Frövel, Braunschweig, Germany

[73] Assignee: Deutsche Forschungsanstalt für Luft- und Raumfahrt e.V., Linder Hohe, Germany

[21] Appl. No.: 985,574

[22] Filed: Dec. 3, 1992

[30] Foreign Application Priority Data

Dec. 3, 1991 [DE] Germany ............... 4139785

[51] Int. Cl.⁶ ............ C03B 19/06; C03C 25/00; B29C 67/00
[52] U.S. Cl. ............ 65/17.3; 65/60.8; 264/571; 264/125
[58] Field of Search .......... 65/18.1, 4.1, 4.4, 60.8, 65/17.3; 264/60, 571, 125, 109, 101, 102, 299, 239, 87, 65

[56] References Cited

U.S. PATENT DOCUMENTS

| | | | |
|---|---|---|---|
| 2,754,221 | 7/1956 | Caroselli | 264/60 |
| 3,077,413 | 2/1963 | Campbell | 264/60 |
| 3,170,197 | 2/1965 | Brenner . | |
| 3,649,406 | 3/1972 | McNish . | |
| 3,702,279 | 11/1972 | Ardary et al. | 264/60 |
| 3,904,427 | 9/1975 | Hawthorne . | |
| 3,932,161 | 1/1976 | McNish | 264/60 |
| 4,428,763 | 1/1984 | Layden . | |
| 4,430,369 | 2/1984 | Payne . | |
| 4,846,866 | 7/1989 | Chyung et al. | 65/18.1 |
| 4,902,326 | 2/1990 | Jarmon | 65/4.1 |
| 5,041,260 | 8/1991 | Johnson et al. . | |
| 5,041,321 | 8/1991 | Bendig | 428/102 |
| 5,126,087 | 6/1992 | Lespade et al. | 264/60 |
| 5,221,645 | 6/1993 | Drouot et al. | 264/60 |

FOREIGN PATENT DOCUMENTS

0275652 12/1987 European Pat. Off. .
3937769 11/1989 Germany .
63-282131 11/1988 Japan .
64-79028 3/1989 Japan ............... 65/18.1

OTHER PUBLICATIONS

Rabinovich et al., "Preparation of Transparent High-Silica Glass Articles from Colloid Gels", Journal of Non-Crystalline Solids, vol. 47, (1982), pp. 435-438.
K. M. Prewo, "The Development of Fiber Reinforced Glasses and Glass Ceramics", Proc. of 21st University Conference on Ceramic Science, Pergamon Press, NY (1986), pp. 529-547.
K. M. Prewo et al., "Fiber Reinforced Glasses and Glass Ceramics for High Performance Applications", Ceramics Bulletin, vol. 65, No. 2, (1986), pp. 305-306.
E. Fitzer, "Fiber REinforced Ceramics and GLasses", Proc. of International Symposium on Factors in Densification and Sintering of Oxide and Non-Oxide Ceramics, 1978, Japan, pp. 650-651.
R. Clasen, "Preparation of HIgh-Purity Silica Glasses by Sintering of Colloid Particles", Glastech Ber., vol. 60 (1987) No. 4, pp. 125-132.
D. L. Segal, "Sol-Gel Processing: Routes to Oxide Ceramics Using Colloid Dispersions of Hydrous Oxides and Alkoxide Intermediates", Journal of Non-Crystalline Solids, vol. 63 (1984), pp. 183-191.
R. A. J. Sambell, "The Technology of Carbon-Fiber-Reinforced Glasses and Ceramics", Proc. of the 2nd Carbon Fiber Conference Plastics and Polymers, (1974), pp. 105-106.
Degussa, AB, Product Leaflet, "Aerosil", Fumed Silica, pp. 30-31.

Primary Examiner—Karen M. Hastings
Assistant Examiner—Steven P. Griffin
Attorney, Agent, or Firm—Salter & Michaelson

[57] ABSTRACT

In a method for manufacturing fibre-reinforced structures with a glass matrix, there is used for the glass matrix an $SiO_2$ colloid dispersed in water as glass former, with which the fibres are impregnated, and the impregnated fibres are heated in the final form of the structure to the sintering temperature of the $SiO_2$ colloid.

13 Claims, No Drawings

METHOD FOR MANUFACTURING FIBRE-REINFORCED STRUCTURES WITH A GLASS MATRIX

BACKGROUND OF THE INVENTION

The invention relates to a method for manufacturing fibre-reinforced structures with a glass matrix.

Fibre-reinforced structures with a glass matrix have in comparison with structures with a synthetic resin matrix in particular the advantage of greater heat resistance, and also of greater resistance to external forms of attack such as oxidation, erosion, attack by acids and similar.

A method is known in which the glass forming the matrix is added to the reinforcing fibres, in particular silicon carbide or carbon fibres, in the form of a fine glass powder. The reinforcing fibres are there passed through a suspension which contains the glass powder and may also contain solvents and/or binders. In this wet method, known as "slurry technique", the reinforcing fibres are wound with the adhering glass powder on reels and then dried. A fibre layer wound in this way is then separated and processed to prepregs for the manufacture of laid fabrics. The laid fabrics made from such prepregs are then compressed under pressure and heat (of the order of magnitude of $>100$ bar, $>1000°$ C.) by so-called hot press moulding. The glass powder adhering to the reinforcing fibres thereby melts and infiltrates the reinforcing fibres. The matrix is formed in this way. There may then be imparted to the laid fabrics during the hot press moulding the form which is envisaged for the finished structure. The use of glass ceramics for the formation of the matrix is moreover also known (K. M. Prewo "The development of fibre reinforced glasses and glass ceramics", Tailoring Multiphase and Composite Ceramics, Proc. of the 21st University Conference on Ceramic Science, Pergamon Press, New York (1986), pp. 529-547; K. M. Prewo et al., Z. Ceramic Bulletin, Vol. 65, No. 2 (1986), pp. 305/306).

A method is also known in which, during the winding of the reinforcing fibres on reels, a quartz glass monofilament is wound in the dry state together with the latter as a filler. Said quartz glass monofilament forms the source for the glass matrix. The expensive slurry technique is therefore avoided (K. M. Prewo, loc. cit., p. 531; E. Fitzer "Fibre reinforced ceramic and glasses", Proc. of International Symposium on Factors in Densification and Sintering of Oxide and Non-Oxide Ceramics, 1978, Japan, pp. 650/651).

The addition of the glass fibres to the reinforcing fibres in particular in the form of fabrics in mat form as intermediate layers is also known (DE-PS 39 37 769 C1).

All the known methods require hot press moulding at pressures of the order of magnitude of $>100$ bar and temperatures $>1000°$ C. Hot press moulding methods are extremely expensive and the size of the structures which can be manufactured by hot press moulding is limited on equipment grounds.

The manufacture of glasses, in particular pure quartz glasses, by means of the colloid-gel method is also known. In this method the glass-forming raw material is provided as an extremely fine powder —$SiO_2$ colloid— which forms a gel when mixed with water. The structures "cast" from said gel are dried and then heated to sintering temperature (Z. Glastech. Ber. 60 (1987), No. 4, pp. 125-132; Journal of Non-Crystalline Solids, 47 (1982), pp. 435-449). The addition of metal oxides to the gel in order to obtain particular glass properties is also known (Journal of Non-Crystalline Solids, 63 (1984), pp. 183-191).

The alkoxide-gel method is also known, in which mixtures of alkoxides are hydrolysed with water and a low-viscosity gel thereby formed, from which high-purity glasses and ceramics, surface coatings and thin films can be manufactured by sintering.

A method is moreover also known for the manufacture of whisker-reinforced composite bodies with glass matrix in which the whiskers are wetted with alkoxides. Small drops are produced from the wetted whiskers by spraying and dried. Extremely small droplets are thereby obtained, from which the desired structures are hot press moulded in moulds under pressure or sintered without pressure at extremely high temperatures of 1550° (EP- 0 275 652 A1; Patents Abstracts of Japan, C-576, Mar. 14 1989, Vol. 13/No. 107, JP-A 63-282131 of Nov. 18 1988).

A method is also known for the manufacture of continuous strand-reinforced composite bodies in which the fibre strands (rovings) are wetted with alkoxides, dried and then sintered. Because of the very low $SiO_2$ content in the hydrolysed alkoxides and the very high shrinkage during the drying, multiple wetting—approx. 16-fold—is necessary here and consequently—as a result also of the cost-intensive manufacture of the alkoxide gel—economic fabrication is not possible (Dr. Armin Pfeiffer "Chemical development of a composite glass body reinforced with continuous strands for application above 800° C.", Dissertation 1989, Universität Karlsruhe).

In the case of fibre-reinforced structures with a glass matrix it is necessary, as in the case of fibre-reinforced structures with a matrix of polymers, to see to it that the matrix completely fills the spaces between the fibres and completely encloses the fibres themselves. In the case of the known method in which the reinforcement fibres are impregnated with a suspension containing glass powder, glass with a grading curve of 3 to 30$\mu$ and above is used. The particle size of the glass therefore lies in the order of magnitude of the fibres, which in the case of SiC fibres comes to 10 $\mu$m. The fibres are therefore after the impregnation by the finely ground glass held mechanically at a distance from one another, and many and large cavities are formed. This is one reason why, in the case of the known method for manufacturing fibre-reinforced structures with a glass matrix, hot press moulding under high pressure (final temperature approx. 1220° C. and final pressure 10 MPa) has to be carried out, in which the softened glass is pressed between and around the fibres. The same applies to the known method in which the glass portion is introduced in the form of glass mats (woven or non-woven fabrics). Hot press moulding requires moulds which are designed for the temperatures and pressures occurring, and is therefore extremely expensive.

SUMMARY OF THE INVENTION

The aim of the invention is to devise a method for manufacturing fibre-reinforced structures with a glass matrix, which may be implemented without compression moulding at normal sintering temperatures and is implementable at far less expense than the known methods with hot press moulding.

Accordingly, the present invention provides a method for manufacturing fibre-reinforced structures with a glass matrix, wherein an $SiO_2$ colloid is dispersed in water, fibres are impregnated with said dispersion, said impregnated fibres are moulded to a desired structure, said structure is dried, and said dried structure is sintered at a temperature between 1150° and 1250° C.

DESCRIPTION OF THE PREFERRED EMBODIMENTS

Basically, in the method according to the invention use is made for the glass matrix of an $SiO_2$ colloid dispersed in water as glass former, with which the fibres are impregnated. The impregnated fibres are moulded to the desired structure, and the structure in its final form is sintered at a temperature between 1150° and 1250° C.

The $SiO_2$ colloid should have a low specific surface and a mean particle size of the primary particles of 40 nm and an $SiO_2$ content of more than 99.8%.

An $SiO_2$ colloid of this kind is sold for example by the firm Degussa AG, Frankfurt/Main, Germany under the name "Degussa Aerosil OX50".

The $SiO_2$ colloid is dispersed in water. In so doing an effort must be made to obtain a high proportion of $SiO_2$ colloid in the water.

Pure $SiO_2$ has a high softening point. In order to reduce the latter, there can be added to the water in which the $SiO_2$ colloid is dispersed, as additional glass modifiers, metal oxides in the form of metal nitrates or metal acids, which are then dissolved in the water. An effort is preferably made to obtain for the glass matrix a high proportion of silicates, by means of which the softening point of the matrix of about 620° C. is attainable. Such a glass is an extremely short glass with a steep viscosity/temperature curve.

A borosilicate glass with the following composition is preferably used:

| | |
|---|---|
| $SiO_2$ | 80.5% by wt |
| $B_2O_3$ | 12.3% by wt |
| $Na_2O$ | 4.2% by wt |
| $Al_2O_3$ | 2.7% by wt |
| CaO | 0.3% by wt |

For the dissolution of the metal nitrates and metal acids the water is heated to about 85° C. The $SiO_2$ colloid is then mixed into the solution.

The fibres are impregnated with the $SiO_2$ colloid gel produced during the dispersion, it being possible for them to be provided as continuous fibre strands (rovings), as well as in the form of woven fibre fabrics, and also as ground fibres (chopped fibres) for example in the form of fibre felts (non-wovens).

The fibres impregnated with the $SiO_2$ colloid gel are placed on heat-resistant moulds, which impart to the fibre-reinforced structures their form, and then dried and degassed. By means of the drying the water is removed from the $SiO_2$ colloid gel. The degassing preferably takes place under vacuum. The structure may moreover be introduced on its mould into a vacuum bag. Said vacuum bag should moreover be so formed that it rests under vacuum crease-free against the surface of the structure lying on the mould. The structure is then simultaneously compression moulded. During the compression moulding the free surface of the structure is smoothed and at the same time surplus $SiO_2$ colloid gel is pressed out.

The drying and degassing may take place in one operation. For example the mould enclosed in the vacuum bag may be introduced together with the superimposed structure into an autoclave, which is first of all heated without pressure to a temperature of approx. 100°-120° C. Compression moulding then takes place by raising of the pressure in the autoclave, for example to about 8 to 10 bar.

Additional outer moulds may also be used for the compression moulding, which however have to be resistant only up to the drying temperature, i.e. outer moulds of for example fibre composites with polymer matrix may be used. Such outer moulds are for example fitted if tubular structures are involved, in the case of which the fibres impregnated with the $SiO_2$ colloid gel are placed on an inner core.

A good surface and a high proportion of fibres are achieved by means of the compression moulding.

The dried structures are then, together with the mould on which they lie, sintered without pressure in a furnace. For this they are with expediency heated in defined temperature steps to approx. 1150° to 1250° C., preferably to about 1230° C.

During the heating the furnace is held in a first step for about three hours at approx. 300° C. Any residual water is thereby expelled. Further heating then takes place to about 500° C., and said temperature is held for 3.5 hours. At said temperature any ethereal components with a higher boiling point are expelled. On completion of said holding time the furnace is then heated continuously up to the final temperature and held at the said temperature for about two hours.

During the heating the added nitrates and the boric acid are converted into the corresponding metal oxides, which together with the $SiO_2$ of the $SiO_2$ colloid form the desired borosilicate glass.

After the cooling the sintered structure may be removed from the mould. There may be manufactured by the method according to the invention structures with wall thicknesses of 1 to 2.5 mm, and also up to 5 mm. A largely non-porous glass matrix is moreover attainable. Use is preferably made as fibre material of commercially available SiC (silicon carbide) fibres. They are distinguished by high heat resistance in oxidising atmosphere—up to approx. 800° C. The fibres, which can be used as slivers, woven fabrics, non-woven fabrics, and also as staple fibres, are impregnated according to methods commonly used in polymer technology, by hand lay-up, continuous impregnation, filament winding and similar. The coupling size usually applied was burned off from the fibres at approx. 700° C. prior to the impregnation.

EXAMPLES

1. For the manufacture of fibre composites with a matrix of borosilicate glass, a colloid dispersion was manufactured as follows:

100 ml of distilled water were heated to approx. 85° C. There were dissolved in the heated water:

| | |
|---|---|
| Boric acid | 8 g |
| Borax (sodium tetraborate) | 13.5 g |
| Aluminium nitrate | 25 g |
| Sodium nitrate | 2.55 g |

| -continued | |
|---|---|
| Calcium nitrate | 1.5 g |

After these constituents had dissolved, 101.2 g of $SiO_2$ colloid with a surface according to BET (DIN 66 131) of $50\pm15 M2/g$ and a mean size of the primary particles of 40 nm (Aerosil OX50 of Degussa AG) were mixed into the solution with a stirrer, the mixture homogenised by ultrasonic treatment and then dispersed with a high-speed stirrer (rotor-stator stirrer). The dispersion was cooled to room temperature; it proved to be highly stable and storable over a long period.

2. The dispersion manufactured in this way was used for the impregnation of slivers and woven fabrics. The coupling size was removed from the fibre strands (rovings) or the woven fabric consisting of fibre strands (rovings) by heating to about 700° C.

2.1 For the manufacture of a tubular structure, fibre strands (rovings) with 500 and 1000 individual fibres were wound off from a supply spool and drawn through a tubular furnace in which the de-sizing was carried out at approx. 700° C. The de-sized fibres were drawn in an impregnation unit through the dispersion charged into the latter. The fibres impregnated in this way were wound onto a high temperature resistant core made of moulding sand. The core with the fibres wound onto it was introduced into an outer mould and compression moulded therein.

The core with the fibres was then vacuum dried in a furnace at a temperature of approx. 110° C.

After the drying the core with the structure wound onto it was introduced into a sintering furnace. The furnace was heated at its natural heating rate to 300° C. Said temperature was held for three hours. After this the temperature was raised further to 500° C. and said temperature then held for a further 3.5 hours. After this the furnace was heated continuously to 1230° C. and held at said temperature for approx. two hours. The furnace was then cooled. The core was removed from the structure. The structure so formed had a largely non-porous glass matrix, by which the fibres were completely surrounded.

2.2 For the manufacture of a two-dimensional laminate, the fibres treated and impregnated as above were wound onto a drum. The still moist fibres were cut through obliquely to the fibre direction and removed from the drum. The unidirectional laminates so obtained were stacked in layers with a fibre orientation alternating by 90° and the laminate so formed was placed moist on a level mould. A level plate was applied to the laminate as a countermould and the mould with the laminate and the countermould was introduced into a vacuum pocket. The vacuum pocket was evacuated and heated to 100° C. The countermould was pressed against the laminate under vacuum and in so doing surplus dispersion was pressed out and a level surface of the laminate produced. After the removal of the countermould the mould with the dried laminate was introduced into a sintering furnace and heated therein as described above.

2.3 For the manufacture of a physically curved structure, desized pieces of fabric made from SiC fibres were impregnated manually. For this the dispersion was poured onto the fabric and distributed uniformly by means of an iron and pressed between the fibres. The fabrics impregnated in this way were placed on the mould in a plurality of layers, covered with a countermould and introduced into a vacuum bag. The vacuum bag was introduced into an autoclave or vacuum oven, which was first of all heated without pressure to a temperature of 120° C. There was applied first of all to the laminate, by means of the vacuum bag, atmospheric pressure. The pressure in the autoclave or vacuum oven was then raised to 10 bar. The mould, together with the laminate dried, degassed and compression moulded in this way, was then introduced into a sintering furnace without the countermould and heated up in the manner described above.

In the case also of the examples 2.2 and 2.3 a largely non-porous glass matrix was obtained, by which the fibres were completely surrounded.

It will be understood that the above description of the present invention is susceptible to various modifications, changes and adaptations.

What is claimed is:

1. A method of manufacturing a fiber-reinforced, glass matrix structure comprising the steps of:
   dissolving a boric acid and a plurality of metal nitrates in a predetermined quantity of distilled water to form a solution, said distilled water having a temperature of about 85 degrees C.;
   dispersing an $SiO_2$ colloid in said solution in a ratio of about 1 part by weight of said $SiO_2$ colloid to about 1 part by weight of said solution to form an $SiO_2$ colloid dispersion, said metal nitrates and said boric acid reducing a softening temperature of said $SiO_2$ colloid;
   impregnating a plurality of fibers with said $SiO_2$ colloid dispersion;
   molding said impregnated fibers to a desired molded structure;
   drying said molded structure; and
   sintering said dried molded structure at a temperature between 1150 and 1250 degrees C.

2. A method of manufacturing a fiber-reinforced, glass matrix structure comprising the steps of:
   dissolving a boric acid and a plurality of metal nitrates in a predetermined quantity of distilled water to form a solution;
   dispersing an $SiO_2$ colloid in said solution to form an $SiO_2$ colloid dispersion, said metal nitrates and said boric acid reducing a softening temperature of said $SiO_2$ colloid;
   impregnating a plurality of fibers with said $SiO_2$ colloid dispersion;
   molding said impregnated fibers to a desired molded structure;
   vacuum drying said molded structure wherein said molded structure is enclosed in a vacuum bag, said vacuum bag is evacuated and said molded structure is heated therein while said vacuum bag is evacuated; and
   sintering said dried molded structure at a temperature between 1150 and 1250 degrees C.

3. In the method of claim 2, said step of vacuum drying comprising the steps of introducing said vacuum bag and said enclosed molded structure into an autoclave, evacuating said vacuum bag and heating said enclosed molded structure under standard pressure to a temperature between 100 and 120 degrees C. while said vacuum bag is evacuated, said method further comprising the step of pressurizing said autoclave to a pressure between 8 and 10 bar after said temperature has been reached.

4. A method of manufacturing a fiber-reinforced structure having a borosilicate glass matrix comprising the steps of:

dissolving boric acid, sodium tetraborate and nitrates of aluminum, sodium and calcium in a predetermined quantity of distilled water to form a solution said distilled water having a temperature of about 85 degrees C.;

dispersing an $SiO_2$ colloid having a mean particle size of about 40 nm in said solution in a ratio of about 1 part by weight of said $SiO_2$ colloid to about 1 part by weight of said solution to form an $SiO_2$ colloid dispersion, said boric acid, sodium tetraborate and nitrates of aluminum, sodium and calcium reducing a softening temperature of said $SiO_2$ colloid;

impregnating a plurality of fibers with said $SiO_2$ colloid dispersion;

placing said impregnated fibers on a heat resistant molding body and molding said impregnated fibers thereon to a desired molded structure;

drying said molded structure while said molded structure is placed on said molding body; and sintering said dried molded structure at a temperature between 1150 and 1250 degrees C. while said dried molded structure is placed on said molding body.

5. In the method of claim 4, said step of drying said molded structure comprising drying said molded structure under vacuum conditions.

6. In the method of claim 5, said step of drying under vacuum conditions comprising the steps of enclosing said molded structure and said molding body in a vacuum bag, evacuating said vacuum bag and heating said enclosed molded structure to a temperature at which water in said dispersion evaporates while said vacuum bag is evacuated.

7. In the method of claim 6, said step of drying under vacuum conditions further comprising the steps of introducing said vacuum bag and said enclosed molded structure into an autoclave, evacuating said vacuum bag and heating said enclosed molded structure and said molding body under standard pressure to a temperature between 100 and 120 degrees C. while said vacuum bag is evacuated, said method further comprising the step of increasing the pressure in said autoclave from standard pressure to a pressure between 8 and 10 bar after said temperature has been reached.

8. The method of claim 4 further comprising the step of placing a counter mold over said molded structure so that said molded structure is pressed between said molding body and said counter mold.

9. In the method of claim 8, said step of drying comprising drying said molded structure while pressed between said molding body and said counter mold.

10. In the method of claim 9, said step of drying comprising drying under vacuum conditions.

11. In the method of claim 4, said fibers comprising SiC fibers.

12. In the method of claim 4, said borosilicate glass matrix having a composition comprising:

| | |
|---|---|
| $SiO_2$ | 80.5% by weight |
| $B_2O_3$ | 12.3% by weight |
| $Na_2O$ | 4.2% by weight |
| $Al_2O_3$ | 2.7% by weight |
| CaO | 0.3% by weight |

13. In the method of claim 4, said SiO2 colloid having a low specific surface according to BET of $50\pm15$ $m^2/g$.

* * * * *